United States Patent [19]
Engell et al.

[11] Patent Number: 5,803,947
[45] Date of Patent: Sep. 8, 1998

[54] METHOD OF PRODUCING METALLIC MAGNESIUM, MAGNESIUM OXIDE OR A REFRACTORY MATERIAL

[75] Inventors: John Engell, Rungsted Kyst; Jens Sønderberg Frederiksen, Copenhagen; Karsten Agersted Nielsen, Gentofte, all of Denmark

[73] Assignee: Mineral Development International A/S, Birkerod, Denmark

[21] Appl. No.: 436,213
[22] PCT Filed: Nov. 16, 1992
[86] PCT No.: PCT/DK92/00339
   § 371 Date: Jul. 13, 1995
   § 102(e) Date: Jul. 13, 1995
[87] PCT Pub. No.: WO94/11539
   PCT Pub. Date: May 26, 1994
[51] Int. Cl.$^6$ ..................................... C22B 26/22
[52] U.S. Cl. .......................... 75/10.33; 75/10.63; 75/419; 75/599; 420/129; 423/346; 423/350; 423/636
[58] Field of Search ................................ 75/10.33, 10.63, 75/599, 419; 420/129; 423/346, 350, 636

[56] References Cited

U.S. PATENT DOCUMENTS

| | | |
|---|---|---|
| 2,257,910 | 10/1941 | Kirk . |
| 2,268,779 | 1/1942 | Seifert . |
| 2,372,571 | 3/1945 | Hansgirg . |
| 2,379,576 | 7/1945 | Hansgirg . |
| 2,527,722 | 10/1950 | Hansgirg . |
| 2,527,724 | 10/1950 | Hansgirg . |
| 2,570,232 | 10/1951 | Hansgirg . |
| 2,582,119 | 1/1952 | Hansgirg . |
| 2,582,120 | 1/1952 | Hansgirg . |
| 4,147,534 | 4/1979 | Hori . |
| 4,200,264 | 4/1980 | Hori . |
| 4,437,886 | 3/1984 | Miura et al. . |
| 4,545,975 | 10/1985 | Kobayashi et al. . |
| 5,383,953 | 1/1995 | Christini ................................ 75/10.33 |

Primary Examiner—Melvyn Andrews
Attorney, Agent, or Firm—Finnegan, Henderson, Farabow, Garrett & Dunner

[57] ABSTRACT

Metallic magnesium and pure magnesium oxide are produced by carbothermal reduction of starting materials such as magnesium oxide containing minor amounts of oxides of Fe, Si, Ca and Al, and/or magnesium silicate minerals, such as olivine, at subatmospheric pressure. Metallic magnesium is evaporated from a reduction zone and pure metallic magnesium and pure magnesium oxide are precipitated in a second condensation zone. Si is partly evaporated as SiO which is precipitated in a first condensation zone upstream the second condensation zone, partly converted to SiC and an alloy of Si and Fe in the reaction mixture. The starting materials may also be processed by a method wherein their magnesium component is converted to magnesium oxide in the reaction mixture, while the remaining components are converted to SiC and an alloy of Si and Fe. Au and valuable siderophilic elements may be recovered by leaching the alloy of Si and Fe.

28 Claims, 4 Drawing Sheets

METHOD OF PRODUCING METALLIC MAGNESIUM, MAGNESIUM OXIDE OR A REFRACTORY MATERIAL

The present invention relates to methods of processing a starting material selected from the group consisting of magnesium oxide containing minor amounts of oxides of Fe, Si, Ca and Al; natural and industrially produced magnesium silicate minerals; and mixtures thereof, e.g. olivine, by carbothermal reduction and methods of producing metallic magnesium, pure magnesium oxide (MgO) and refractory masses consisting of MgO, $Mg_2SiO_4$ and SiC by carbothermal reduction of starting materials selected from the above-mentioned group.

REVIEW OF PRIOR ART

1. MAGNESIUM

In general metallic magnesium is produced by electrolytic and by thermal processes. By the thermal processes two groups of minerals/rocks are used as starting materials.

The first group in which magnesium oxide is bound to carbon dioxide, includes i.a. the minerals magnesite and dolomite.

The second group in which magnesium oxide is bound to silicon dioxide, includes i.a. the mineral olivine.

Although the minerals in the second group, such as olivine, occur in large deposits and exhibit a high magnesium content, the industry has mainly been employing magnesite and dolomite, i.e. starting materials from the first group for the production of magnesium.

This is due to the fact that it has been found more easy to remove and separate $CO_2$ from the members of the first group than to remove and separate $SiO_2$ from the members of the second group.

In general two classes of methods have been suggested for removing and separating $SiO_2$ from the second group: The wet methods wherein the ores are treated with strong mineral acids, and the direct reduction methods wherein the magnesium oxide component of the ores is reduced to and withdrawn as gaseous Mg.

The direct methods may be classified in two groups.

In the first group of direct reduction methods, which have only been suggested in connection with reduction of metal oxides, i.e. not metal silicates, reducing agents are employed forming gaseous oxygen containing reaction products, for example reduction of MgO with carbon as reducing agent forming Mg and CO as gaseous oxygen-containing reaction product at atmospheric pressure and a temperature about 1850° C., or other carbothermal reduction methods, vide e.g. U.S. Pat. No. 2,268,779 (SEIFERT), and U.S. Pat. Nos. 2,582,119 and 2,582,120 (HANSGIRG).

When a mixture of magnesium silicate, e.g. olivine ($Mg_{2-x}Fe_xSiO_4$; x:0–1), and carbon is heated to a temperature in the interval from about 1300° C. to about 2200° C., the following reactions occur:

$$(Mg_{2-x}Fe_x)\,SiO_4(s) + (1 + x(1 + 2))C(s) \longleftrightarrow \quad (1)$$

$$(2 - x)MgO(s) + (1 - zx)SiO(g) + (1 + x(1 + z))CO(g) +$$

$$x\text{"}Si_zFe\text{"}(1)(\text{an alloy of Si and Fe})$$

(1') $Mg_2SiO_4(s)+3\,C(s)\longleftrightarrow 2\,MgO(s)+SiC(s)+2\,CO(g)$
(1") $Mg_2SiO_4(s)+3\,C(s)\longleftrightarrow 2\,Mg(g)+SiO(g)+3\,CO(g)$
(1''') $Mg_2SiO_4(s)+5\,C(s)\longleftrightarrow 2\,Mg(g)+SiC(s)+4\,CO(g)$
(2) $MgO(s)+C(s)\longleftrightarrow Mg(g)+CO(g)$
(3) $SiO(g)+C(s)\longleftrightarrow Si(s/l)+CO(g)$
(4) $Si(s/l)+C(s)\longleftrightarrow SiC(s)$ where (s), (l) and (g) designate: Solid, liquid and gaseous phase, respectively.

These equilibria, except equilibrium (4), are all shifted to the right by increasing temperature and decreasing pressure.

Similar reactions occur by carbothermal reduction of MgO containing impurities such as oxides of Fe, Si, Ca and Al, in the following referred to as "crude MgO".

Due to the formation of the gaseous components Mg(g) and SiO(g) transport of Mg and SiO may occur within the reaction mixture and Mg and SiO may even be removed therefrom by evaporation.

Thus, solid Mg may be collected by condensation of evaporated metallic Mg in a separate condensation zone, i.e. in a condenser positioned at a distance from the reaction mixture.

A problem inherently associated with the first group of direct methods consists in the possibility of back-reaction, vide equation (2), between magnesium and the gaseous oxygen containing reaction product whereby magnesium is oxidized to magnesium oxide.

This problem has been solved in the second group of direct methods by using reducing agents which form non-gaseous reaction products, for example reduction of magnesium ores with silicon, aluminium, calcium carbide or silicon carbide.

Methods belonging to the second group of direct reduction methods have been described in a number of patent specifications, e.g. U.S. Pat. Nos. 2,372,571, 2,379,576, 2,527,722, 2,527,724 and 2,570,232 (HANSGIRG), and have also been operated in practice, e.g. the HANSGIRG process mentioned above, the Pidgeon and Bolzano processes (reaction between calcined dolomite and ferrosilicon at about 1200° C. at reduced pressure), and the Magnetherm process (reduction of calcined dolomite with ferrosilicon in presence of alumina at about 1600° C. and 4 kPa).

The prior art has suggested different other solutions to the problem of avoiding back-reaction: In connection with carbothermal reduction of MgO, i.a. the following:

Minimize back-reaction in the exit gas from the carbothermal reduction of MgO by instant quenching of the exit gas from the carbothermal zone, e.g. shock-cooling by injection of cooling media or by rapid adiabatic cooling, vide e.g. U.S. Pat. Nos. 2,582,119 and 2,582,120 (HANSGIRG), EP patent application No. 75,836 (AVERY) and U.S. Pat. No. 4,200,264 (HORI); or precipitating Mg at reduced pressure, vide e.g. DE PS 49,329 (KNÖFLER), U.S. Pat. No. 2,257,910 (KIRK), and Trans. Insti. Min. Metal. 99, May–August 1990, page C105–C111 (WINAND et al.).

By carbothermal reduction of magnesium silicates the CO production is increased compared with the CO production obtained by carbothermal reduction of magnesium oxide, because CO is produced not only by reduction of MgO, but also of $SiO_2$.

If the reaction pressure is decreased during carbothermal reduction of $Mg_2SiO_4$ increasing amounts of SiO will evaporate from the reaction mixture resulting in an increasing SiO/Mg ratio in the exit gas from the reaction mixture.

The first problem to be solved by the present invention is to provide a carbothermal process for producing Mg from starting materials selected from the group consisting of magnesium oxide containing minor amounts of oxides of Fe, Si, Ca and Al; natural and industrially produced magnesium silicate minerals; and mixtures thereof, e.g. olivine, avoiding contamination of the Mg end product i) with MgO and C, produced by the above-mentioned back-reaction, and ii) with condensation products originating from SiO, such as $Mg_2SiO_4$, Si, SiC, $SiO_2$, etc.

2. MAGNESIUM OXIDE

According to prior art crude qualities of magnesium oxide, i.e. magnesium oxide containing impurities such as oxides of Fe, Si, Ca and Al, are produced by calcining magnesium hydroxide, magnesium carbonate or basic magnesium carbonate.

Magnesium hydroxide is produced from seawater on a large scale by a process wherein $Mg(OH)_2$ is precipitated by addition of calcium hydroxide. The precipitated magnesium hydroxide usually contains trace amounts of oxides of B, Ca, Si, Al and Fe as impurities. These contaminants have a deleterious effect on the behaviour of the magnesium oxide product during sintering and in its subsequent applications and considerable efforts are put into the removal of these impurities, leading to high processing costs.

High purity magnesium oxide is produced by fusing basic magnesia (MgO) by electric arc melting. In this method, which is described, i.a. in Radex Rundschau 1958, Heft 2, p. 92–104 (EIPELTAUER et al.), refining of the MgO is achieved through the migration of impurities via liquid or gaseous phases towards the surface before or during cooling of the melted MgO charge. After solidification the impure parts of the solid MgO block is removed by mechanical means. Thus, apart from the inherent high energy costs of melting MgO, a relatively high waste/product ratio is obtained when this method is used.

It is further known to produce a fine powder of high purity magnesium oxide (periclase) suitable for production of advanced technical ceramics by a process in which metallic magnesium is vaporized at 700° C. or more in an inert gas flow and mixed with an oxygen containing gas to provide a flow of a reaction mixture in which the magnesium vapor is oxidized to fine magnesium oxide particles which are collected from the reaction mixture, for instance by a filter, vide e.g. GB patent application No. 2 141 701 A (KOBAYASHI) and GB patent application No. 2 183 622 (YOSHIDA).

A disadvantage of these prior art methods of producing high purity magnesium oxide consists in the necessity of using expensive magnesium as starting material.

The second problem to be solved by the present invention is to provide a process for producing high purity magnesium oxide from inexpensive starting materials, said high purity magnesium oxide products being essentially free of oxides of Ca, Si, Al and Fe.

3. PROCESSING MAGNESIUM SILICATES

It is well-known to produce refractory materials by sintering olivine powder at a temperature within the interval 1540°–1710° C. at oxidizing conditions at atmospheric pressure. In order to avoid formation of low melting phases the content of oxides of calcium, aluminium and iron in the olivine starting material should be rather low, typically less than 7 wt %, vide Ullmanns Encyklopädie der technischen Chemie, 4th Edition, Vol. 11, pages 561–562, but even when these qualities of olivine are used, the resulting sintered product cannot be classified as high performance refractory material.

SiC is an example of a high performance refractory material. It may be produced in an electric furnace by reduction of $SiO_2$ with carbon at a temperature of about 2200°–2400° C.

Technical grade magnesium oxide is further processed by sintering at temperatures up to 1900° C. to dead-burned magnesia, which is an important refractory material used in the steel industry.

Increasing demands for high performance refractory materials, used in the modern steel making industry, has shifted market requirement towards pure high-density magnesia sinters.

The third problem to be solved by the present invention is to provide a simple and inexpensive process for producing high performance refractories using inexpensive raw materials, selected from the group, consisting of magnesium oxide, containing minor amounts of oxides of Fe, Si, Ca and Al; natural and industrially produced magnesium silicate minerals; and mixtures thereof, e.g. olivine.

It is further desired to provide a general method of processing members of the above-mentioned group allowing recovery of valuable metallic elements contained in low concentrations in magnesium silicate rocks and minerals such as Mn, Cr, Ni, Au and members of the platinum group.

DEFINITION OF THE INVENTION

1. MAGNESIUM

It has now been found that the first problem can be solved by a method of producing metallic magnesium by carbothermal reduction of a starting material selected from the group consisting of magnesium oxide containing minor amounts of oxides of Fe, Si, Ca and Al; natural and industrially produced magnesium silicate minerals; and mixtures thereof, e.g. olivine, which comprises mixing the starting material with carbon in an amount of at least 1 mole C/mole $SiO_2$ plus at least 1 mole C/mole FeO plus at least 1.3 mole C/mole $Fe_2O_3$ plus at least 1 mole C/mole MgO, preferably in an amount of at least 2 mole C/mole $SiO_2$ plus at least 1 mole C/mole FeO plus at least 1.3 mole C/mole $Fe_2O_3$ plus at least 1 mole C/mole MgO, in particular in an amount of at least 3 mole C/mole $SiO_2$ plus 1 mole C/mole FeO plus 1.3 mole C/mole $Fe_2O_3$ plus 1 mole C/mole MgO, preferably in an amount of less than 4 C/mole $SiO_2$ plus 2 mole C/mole FeO plus 4 C/mole $Fe_2O_3$ plus 2 mole C/mole MgO;

heating the mixture in a reduction zone to a temperature $T_r$ within the interval 1400°–1700° C., preferably less than 1500° C., at a pressure $p_r$ within the interval 0.01–1.75 kPa, preferably 0.2–1.1 kpa, in particular 0.3–0.7 kPa;

reducing the iron oxide component of the starting material to iron in the reduction zone;

reducing the silica component of the starting material to SiO, which is partly converted to SiC and an alloy of Si and Fe, "$Si_zFe$", in the reduction zone, partly evaporated from the reduction zone and converted to SiC, Si, and/or $Mg_2SiO_4$ by reaction with carbon in a separate first condensation zone at a pressure $p_1$ within the interval 0.01–1.1 kPa, preferably 0.2–0.8 kPa, in particular 0.3–0.7 kPa, at a temperature $T_1$ higher than:

$$T_{min} °C. = \frac{-32217}{2\log p_1 - 19.92} - 273.15$$

where $p_1$ is in kPa, and below ($T_{min}$+100° C.), preferably ($T_{min}$+50° C.), in particular ($T_{min}$+25° C.) and in any case below $T_r$;

reducing the magnesium oxide component of the starting material to gaseous metallic magnesium in the reduction zone;

evaporating said gaseous metallic magnesium from the reduction zone and condensating said gaseous metallic magnesium in a separate second condensation zone arranged downstream the first condensation zone at a pressure $p_2$ within the interval 0.01–1.1 kPa, preferably 0.2–0.8 kPa, in particular 0.3–0.7 kPa, at a temperature $T_2$ less than 638° C., preferably within the interval 200°–600° C., in particular within the interval 250°–540° C.; and withdrawing the CO formed by the above-mentioned reduction processes from the second condensation zone and maintaining the pressure $p_2$ at a preselected value by use of a pump;

whereby the temperature gradient between the first condensation zone and the second condensation zone is kept as steep as possible; and whereby $p_2 \leq p_1 \leq p_r$.

The basic philosophy behind this first aspect of the present invention is: Control the processes of transport of gaseous magnesium and SiO by carbothermal reaction of crude magnesium oxide and magnesium silicate minerals, i.e. control the location of formation of products and by-products by selecting appropriate values and gradients of the following process parameters: Pressure (value and gradient), temperature (value and gradient), and carbon percentage of charge (value) in the reaction zone and in the first and second condensation zone.

The evaporated material is recovered by condensation at lower temperatures. Thus, the evaporated SiO(g) is recovered, essentially as Si(s) or SiC(s) in a suitably designed first condenser operating at a temperature lower than the bed temperature and higher than the temperature ($T_{min}$), where MgO(s) can form by back-reaction according to:

$$Mg(g)+CO(g) \rightarrow MgO(s)+C(s) \qquad (2')$$

The evaporated Mg(g) may then be recovered in a suitably designed second condenser operating at a temperature below $T_{min}$ as Mg(s), back-reaction (2') being avoided by operating at low pressure and by keeping a steep temperature gradient between the first and the second condenser.

It is advantageous to use 5 moles or more of carbon (C) for each mole of olivine ($Mg_2SiO_4$), when the purpose is to produce pure Mg(s) or MgO(s) well separated from silicon containing phases by carbothermal conversion of olivine. The reaction will then proceed according to:

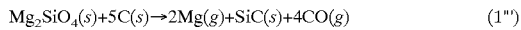

$$Mg_2SiO_4(s)+5C(s) \rightarrow 2Mg(g)+SiC(s)+4CO(g) \qquad (1''')$$

This ensures total evaporation of magnesium and maximum retention of silicon in the bed as silicon carbide (and "$Si_xFe$" when iron is present). Thus, the amount of SiO(g) to be condensed as Si(s) or SiC in the first condenser will be the smallest possible.

The present invention for production of pure Mg(s) is based on purification of the gas phase formed by carbothermal processing of magnesium silicate minerals and rocks as well as impure magnesium oxide by condensation of the evaporated SiO(g) as Si(s) or SiC(s) in a suitably designed first condenser. This is most efficiently done by the formation of SiC(s) according to:

$$SiO+2C \rightarrow SiC+CO \qquad (3)$$

at a temperature just above $T_{min}$, where MgO(s) could form by back-reaction between Mg(g) and CO(g). $T_{min}$ is given by the following equation ($P_{tot}$ in kPa):

$$T_{min} °C.=-32217(2\log(P_{tot})-19.92)^{-1}-273.15$$

As mentioned the SiO is reacted with carbon in the first condensation zone. Said zone is advantageously shaped as single tube or as an array of parallely arranged tubes manufactured of or coated with reactive carbon.

Starting materials suitable for use in the above-mentioned method are crude magnesia, i.e. magnesia containing minor amounts of impurities such as oxides of Fe, Si, Ca and Al, and
magnesium silicates, i.e. natural or industrially manufactured magnesium silicate minerals.

Crude magnesia comprises calcined (heat treated at approx. 1000° C.) compounds derived from magnesite, brucite, kieserite, or similar industrially derived materials, such as waste periclase furnace lining and filter dust from magnesite calcining plants.

The crude magnesia should contain more than 50% MgO, in particular more than 80% MgO.

Preferably the content of CaO should be less than 1%, in particular less than 0.5%.

Preferably the content of alkali metals should be less than 1%, in particular less than 0.3% calculated as oxides.

Preferably the sum of other volatile elements such as S and Cl and metals like Zn, Cd, Hg, etc. should be less than 1%, in particular less than 0.5%.

Magnesium silicates include natural or calcined (heat treated at 1000° C.) silicate minerals such as olivines, serpentines, vermiculites, anthophyllites, cummingtonites, enstatites, pyropes, spinels and similarly composed industrially derived compounds with Mg as a major component as defined below.

Preferably the magnesium silicates should contain more than 25% MgO, in particular more than 40% MgO.

Preferably the content of CaO should be less than 1%, in particular less than 0.5%.

Preferably the content of alkali metals should be less than 1%, in particular less than 0.3% calculated as oxides.

If the content of $Al_2O_3$ is higher than 3%, reaction temperatures in the reduction zone should be lower than 1550° C. to avoid formation of aluminium carbide.

Preferably the sum of other volatile elements such as S and Cl and metals like Zn, Cd, Hg, etc. should be less than 1%, in particular less than 0.5%.

Magnesium silicates further include natural rocks composed of more than 50% Mg silicates as defined above, preferably more than 80%, in particular rocks composed of more than 90% silicates, and upgraded magnesium silicate rich industrial waste products, such as used forsterite furnace linings.

In the present context the term "carbon" is intended comprise carbon rich materials, such as antracite, carbon black and coke.

These carbon rich materials should in general have the following analysis:

C content>90%

Ash content<2%

Volatiles<8%

Preferably C content>96%

Ash content<1%

Volatiles<3%

In particular C content>98.5%

Ash conent<0.5%

Volatiles<1.0%

The starting material is preferentially ground to an average particle size less than about 45 $\mu$m. The carbon rich material has preferentially an average particle size about 100 nm. The reaction mixture is preferentially introduced into the reduction zone as briquettes having a porosity of about 57%.

The steep temperature gradient between the first and the second condensation zone may be obtained by means of quenching methods suggested for use in carbothermal processing technique as described in the patent specifications cited above.

According to preferred embodiments:
- the steep temperature gradient between the first and second condensation zone is provided by rapid cooling comprising introducing the gas from the first condensation zone into a divergent nozzle operated under the condition of underexpansion, ejecting said mixed gas through said divergent nozzle, and enabling said mixed gas to adiabatically expand at a supersonic velocity, whereby the expansion ratio in the nozzle is selected within the interval 12.5–2, preferably within the interval 12.5–6;
- the silica component of the starting material is essentially converted to SiC in the reaction mixture by operating with an amount of added carbon within the interval 3–4 moles, C/mole $SiO_2$ plus 1–2 moles C/mole FeO plus 3–4 moles C/mole $Fe_2O_3$ plus 1–2 moles C/mole MgO;
- the temperature gradient between the reduction zone and the first condensation zone is kept as steep as possible;
- magnesium oxide containing minor amounts of oxides of Fe, Si, Ca and Al is used as starting material;
- olivine is used as starting material;
- $T_r$ is less than 1550° C., when the $Al_2O_3$ content of the reaction mixture is greater than 1 wt %;
- the "$Si_zFe$" and the metallic iron are separated from the residue in the reduction zone by conventional methods, such as magnetic or electrostatic separation or flotation, whereafter Au and siderophilic elements, such as Mn, Cr, Ni and metals from the platinum group are recovered by conventional methods, such as leaching; and
- the SiC formed in the reduction zone and the first condensation zone is recovered as a by-product from the residue in the reduction zone and the first condensation zone, respectively.

The recovered SiC is a micro-size product of high purity.

The magnesium may, depending on the conditions in the second condensation zone, precipitate as macro-size crystals, but also as a pyrophoric mass, which can be melted and moulded into ingots by conventional methods.

2. MAGNESIUM OXIDE

It has further been found that the second problem can be solved by a method of producing pure magnesium oxide by carbothermal reduction of a starting material selected from the group consisting of magnesium oxide containing minor amounts of oxides of Fe, Si, Ca and Al; natural and industrially produced magnesium silicate minerals; and mixtures thereof, e.g. olivine, which comprises
- mixing the starting material with carbon in an amount of at least 1 mole C/mole $SiO_2$ plus at least 1 mole C/mole FeO plus at least 3 mole C/mole $Fe_2O_3$ plus at least 1 mole C/mole MgO,
  - preferably in an amount of at least 2 mole C/mole $SiO_2$ plus at least 1 mole C/mole FeO plus at least 3 mole C/mole $Fe_2O_3$ plus at least 1 mole C/mole MgO,
  - in particular in an amount of at least 3 mole C/mole $SiO_2$ plus 1 mole C/mole FeO plus 3 mole C/mole $Fe_2O_3$ plus 1 mole C/mole MgO,
  - preferably in an amount of less than 4 C/mole $SiO_2$ plus 2 mole C/mole FeO plus 4 C/mole $Fe_2O_3$ plus 2 mole C/mole MgO;
- heating the mixture in a reduction zone to a temperature $T_r$ within the interval 1400°–1700° C., preferably less than 1500° C., at a pressure $p_r$ within the interval $0.01–10^{(-16381 \cdot (T_r+273)^{-1}+10.03)}$ kpa,
  - preferably $0.2–10^{(-16381 \cdot (T_r+273)^{-1}+10.03)}$ kpa,
  - in particular 0.3–1.75 kPa;
- reducing the iron oxide component of the starting material to iron in the reaction mixture;
- reducing the silica component of the starting material to SiO, which is partly converted to SiC and an alloy of Si and Fe, "$Si_zFe$", in the reduction zone, partly evaporated from the reduction zone and converted to SiC, Si, and/or $Mg_2SiO_4$ by reaction with carbon in a separate first condensation zone at a pressure $p_1$, where $p_1 \leq p_r$, and at a temperature $T_1$ higher than:

$$T_{min} \text{ °C.} = \frac{-32217}{2\log p_1 - 19.92} - 273.15$$

where $p_1$ is in kPa, and below ($T_{min}+100°$ C.), preferably ($T_{min}+50°$ C.), in particular ($T_{min}+25°$ C.) and in any case below $T_r$;
- reducing the magnesium oxide component of the starting material at least partially to gaseous metallic magnesium in the reduction zone;
- evaporating said gaseous metallic magnesium from the reduction zone and re acting said gaseous metallic magnesium with the CO formed in the reduction zone to MgO and C, and precipitating these reaction products as a mixture of carbon and magnesium oxide in a separate oxidation and condensation zone arranged downstream the first condensation zone, at a pressure $p_2$, where $p_2 \leq p_1$, and at a temperature $T_2$ within the interval from 638° C. to $T_1$, preferably from 650° C. to $T_1$–50, in particular from 800° to 1000° C.;
- withdrawing the mixture of carbon and magnesium oxide from the oxidation and condensation zone and removing carbon from the withdrawn product, e.g. by oxidation; and
- withdrawing that part of the CO formed by the above-mentioned reduction processes, which has not been consumed by reaction with Mg, from the oxidation and condensation zone and maintaining the pressure $p_2$ at a preselected value by use of a pump;

whereby $p_2 \leq p_1 \leq p_r$.

It has further been found that the second problem can also be solved by a method of producing pure magnesium oxide by carbothermal reduction of a starting material selected from the group consisting of magnesium oxide containing minor amounts of oxides of Fe, Si, Ca and Al; natural and industrially produced magnesium silicate minerals; and mixtures thereof, e.g. olivine, which comprises
- mixing the starting material with carbon in an amount of at least 1 mole C/mole $SiO_2$ plus at least 1 mole C/mole FeO plus at least 3 mole C/mole $Fe_2O_3$ plus at least 1 mole C/mole MgO,
  - preferably in an amount of at least 2 mole C/mole $SiO_2$ plus at least 1 mole C/mole FeO plus at least 3 mole C/mole $Fe_2O_3$ plus at least 1 mole C/mole MgO,
  - in particular in an amount of at least 3 mole C/mole $SiO_2$ plus 1 mole C/mole FeO plus 3 mole C/mole $Fe_2O_3$ plus 1 mole C/mole MgO,
  - preferably in an amount of less than 4 C/mole $SiO_2$ plus 2 mole C/mole FeO plus 4 mole C/mole $Fe_2O_3$ plus 2 mole C/mole MgO;
- heating the mixture in a reduction zone to a temperature $T_r$ within the interval 1400°–1700° C., preferably less than 1500° C., at a pressure $p_r$ within the interval $0.01–10^{(-16381\cdot(T_r+273)^{-1}+10.03)}$ kPa,
preferably
$0.2–10^{(-16381\cdot(T_r+273)^{-1}+10.03)}$ kPa,
in particular
0.3–1.75 kPa;

reducing the iron oxide component of the starting material to iron in the reduction zone;

reducing the silica component of the starting material to SiO, which is partly converted to SiC and an alloy of Si and Fe, "Si$_z$Fe", in the reduction zone, partly evaporated from the reduction zone and converted to SiC, Si, and/or Mg$_2$SiO$_4$ by reaction with carbon in a separate first condensation zone at a pressure $p_1$, where $p_1 \leq p_r$, and at a temperature $T_1$ higher than:

$$T_{min} °C. = \frac{-32217}{2\log p_1 - 19.92} - 273.15$$

where $p_1$ is in kPa, and below ($T_{min}+100°$ C.), preferably ($T_{min}+50°$ C.), in particular ($T_{min}+25°$ C.) and in any case below $T_r$;

reducing the magnesium oxide component of the starting material at least partially to gaseous metallic magnesium in the reduction zone;

evaporating said gaseous metallic magnesium from the reduction zone and reacting said gaseous metallic magnesium with a separately added oxygen containing gas, such as molecular oxygen, air, CO$_2$, CO, H$_2$O and mixtures thereof, to magnesium oxide and precipitating said magnesium oxide in a separate oxidation and condensation zone arranged downstream the first condensation zone at a pressure $p_2$, where $p_2 \leq p_1$, and at a temperature $T_2$ within the interval from 638° C. to $T_1$, preferably from 650° C. to $T_1-50$, in particular from 800° to 1000° C.;

withdrawing the magnesium oxide from the oxidation and condensation zone and, if necessary, removing carbon from the withdrawn product by oxidation; and withdrawing the gases formed by the above-mentioned reduction and oxidation processes from the oxidation and condensation zone and maintaining the pressure $p_2$ at a preselected value by use of a pump;

whereby $p_2 \leq p_1 \leq p_r$.

The basic philosophy behind this second aspect of the present invention is essentially the same as that behind the first aspect.

The evaporated material is recovered by condensation at lower temperatures. Thus, the evaporated SiO(g) may be recovered as Si(s) or SiC(s) in a suitably designed first condenser operating at a temperature lower than the bed temperature and higher than the temperature ($T_{min}$), where MgO(s) can form by back-reaction according to:

Mg(g)+CO(g)→MgO(s)+C(s)      (2')

The evaporated Mg(g) may then be recovered in a suitably designed second condenser operating at a temperature below $T_{min}$ as either MgO(s) mixed with C (s) according to the back-reaction given above, or as MgO(s), when molecular oxygen, air, CO, H$_2$O and mixtures thereof are added separately.

It is advantageous to use 5 moles or more of carbon (C) for each mole of olivine (Mg$_2$SiO$_4$), when the purpose is to produce pure Mg(s) or MgO(s) well separated from silicon containing phases by carbothermal conversion of olivine. The reaction will then proceed according to:

Mg$_2$SiO$_4$(s)+5C(s)→2Mg(g)+SiC(s)+4CO(g)      (1''')

This ensures total evaporation of magnesium and maximum retention of silicon in the bed as silicon carbide (and "Si$_z$Fe" when iron is present). Thus, the amount of SiO(g) to be condensed as Si(s) or SiC in the first condenser will be the smallest possible.

The present invention for production of pure MgO(s) is based on purification of the gas phase formed by carbothermal processing of magnesium silicate minerals and rocks as well as impure magnesium oxide by condensation of the evaporated SiO(g) as Si(s) or SiC(s) in a suitably designed first condenser. This is most efficiently done by the formation of SiC(s) according to:

SiO+2C→SiC+CO      (3)

at a temperature just above $T_{min}$, where MgO(s) could form by back-reaction between Mg(g) and CO(g). $T_{min}$ is given by the following equation ($P_{tot}$ in kPa):

$T_{min} °C.=-32217(2\log(P_{tot})-19.92)^{-1}-273.15$

As mentioned the SiO is reacted with carbon in the first condensation zone. Said zone is advantageously shaped as as single tube or as an array of parallely arranged tubes manufactured of or coated with reactive carbon.

Starting materials suitable for use in the above-mentioned method are crude magnesia, i.e. magnesia containing minor amounts of impurities such as oxides of Fe, Si, Ca and Al, and magnesium silicates, i.e. natural or industrially manufactured magnesium silicate minerals.

Crude magnesia comprises calcined (heat treated at approx. 1000° C.) compounds derived from magnesite, brucite, kieserite, or similar industrially derived materials, such as waste periclase furnace lining and filter dust from magnesite calcining plants.

The crude magnesia should contain more than 50% MgO, in particular more than 80% MgO.

Preferably the content of CaO should be less than 1%, in particular less than 0.5%.

Preferably the content of alkali metals should be less than 1%, in particular less than 0.3% calculated as oxides.

Preferably the sum of other volatile elements such as S and Cl and metals like Zn, Cd, Hg, etc. should be less than 1%, in particular less than 0.5%.

Magnesium silicates include natural or calcined (heat treated at 1000° C.) silicate minerals such as olivines, serpentines, vermiculites, anthophyllites, cummingtonites, enstatites, pyropes, spinels and similarly composed industrially derived compounds with Mg as a major component as defined below.

Preferably the magnesium silicates should contain more than 25% MgO, in particular more than 40% MgO.

Preferably the content of CaO should be less than 1%, in particular less than 0.5%.

Preferably the content of alkali metals should be less than 1%, in particular less than 0.3% calculated as oxides.

If the content of Al$_2$O$_3$ is higher than 3%, reaction temperatures in the reduction zone should be lower than 1550° C. to avoid formation of aluminium carbide.

Preferably the sum of other volatile elements such as S and Cl and metals like Zn, Cd, Hg, etc. should be less than 1%, in particular less than 0.5%.

Magnesium silicates further include natural rocks composed of more than 50% Mg silicates as defined above, preferably more than 80%, in particular rocks composed of more than 90% silicates, and upgraded magnesium silicate rich industrial waste products, such as used forsterite furnace linings.

In the present context the term "carbon" is intended comprise carbon rich materials, such as antracite, carbon black and coke.

These carbon rich materials should in general have the following analysis:

C content>90%

Ash content<2%

Volatiles<8%

Preferably C content>96%

Ash content<1%

Volatiles<3%

In particular C content>98.5%

Ash content<0.5%

Volatiles<1.0%

The starting material is preferentially ground to an average particle size less than about 45 $\mu$m. The carbon rich material has preferentially an average particle size about 100 nm. The reaction mixture is preferentially introduced into the reduction zone as briquettes having a porosity of about 57%.

According to preferred embodiments:

the silica component of the starting material is essentially converted to SiC in the reaction mixture by operating with an amount of added carbon within the interval 3–4 moles C/mole $SiO_2$ plus 1–2 moles C/mole FeO plus 3–4 moles C/mole $Fe_2O_3$ plus 1–2 moles C/mole MgO;

the temperature gradient between the reduction zone and the first condensation zone is kept as steep as possible;

the temperature gradient between the first condensation zone and the oxidation and condensation zone is kept as steep as possible;

magnesium oxide containing minor amounts of oxides of Fe, Si, Ca and Al is used as starting material;

olivine is used as starting material;

$T_r$ is less than 1550° C., when the $Al_2O_3$ content of the reaction mixture is greater than 1 wt %;

the "$Si_zFe$" and the metallic iron are separated from the residue in the reduction zone by conventional methods, such as magnetic or electrostatic separation or flotation, whereafter Au and siderophilic elements, such as Mn, Cr, Ni and metals from the platinum group are recovered by conventional methods, such as leaching; and the SiC formed in the reduction zone and the first condensation zone is recovered as a by-product from the residue in the reduction zone and the first condensation zone, respectively.

The recovered SiC is a micro-size product of high purity.

3. PROCESSING MAGNESIUM SILICATES

It has further been found that the third problem can be solved by a method of processing a starting material selected from the group consisting of magnesium oxide containing minor amounts of oxides of Fe, Si, Ca and Al; natural and industrially produced magnesium silicate minerals; and mixtures thereof, e.g. olivine, which comprises mixing the starting material with carbon in an amount of at least 1 mole C/mole $SiO_2$ plus at least 1 mole C/mole FeO plus at least 3 mole C/mole $Fe_2O_3$ plus at least 1 mole C/mole MgO, preferably in an amount of at least 2 mole C/mole $SiO_2$ plus at least 1 mole C/mole FeO plus at least 3 mole C/mole $Fe_2O_3$ plus at least 1 mole C/mole MgO, in particular in an amount of at least 3 mole C/mole $SiO_2$ plus 1 mole C/mole FeO plus 3 mole C/mole $Fe_2O_3$ plus 1 mole C/mole MgO, preferably in an amount of less than 4 C/mole $SiO_2$ plus 2 mole C/mole FeO plus 4 mole C/mole $Fe_2O_3$ plus 2 mole C/mole MgO;

heating the mixture in a reaction zone to a temperature $T_r$ within the interval 1400°–1800° C., preferably less than 1700° C., at a pressure $p_r$ within the interval $10^{(-16381 \cdot (T_r+273)^{-1}+10.03)} - 10^{(-17043 \cdot (T_r+273)^{-1}+10.75)}$ kPa, preferably at 1700°–1750° C. and about 101 kPa (1 atm), whereby the iron oxide component of the starting material is reduced to iron in the reaction mixture, the silica component of the starting material is at least partially converted to SiC and an alloy of Si and Fe, "$Si_zFe$", in the reaction zone, and the magnesium oxide component of the starting material is at least partially converted to magnesium oxide (periclase);

withdrawing the essentially fully converted mixture as end product from the reaction zone;

withdrawing the CO formed by the above-mentioned reduction processes from the reaction zone and maintaining the pressure $p_r$ in the reaction zone at a preselected value by use of a pump; and if desired, precipitating a mixture of MgO, $Mg_2SiO_4$, Si and SiC from the gas withdrawn from the reaction zone in a separate condensation zone arranged upstream the pump at a pressure $p_1 \leq p_r$ and at a temperature within the interval 800°–1500° C. and recovering said precipitated material.

Starting materials suitable for use in the above-mentioned method are crude magnesia, i.e. magnesia containing minor amounts of impurities such as oxides of Fe, Si, Ca and Al, and magnesium silicates, i.e. natural or industrially manufactured magnesium silicate minerals.

Crude magnesia comprises calcined (heat treated at approx. 1000° C.) compounds derived from magnesite, brucite, kieserite, or similar industrially derived materials, such as waste periclase furnace lining and filter dust from magnesite calcining plants.

The crude magnesia should contain more than 50% MgO, in particular more than 80% MgO.

Preferably the content of CaO should be less than 1%, in particular less than 0.5%.

Preferably the content of alkali metals should be less than 1%, in particular less than 0.3% calculated as oxides.

Preferably the sum of other volatile elements such as S and Cl and metals like Zn, Cd, Hg, etc. should be less than 1%, in particular less than 0.5%.

Magnesium silicates include natural or calcined (heat treated at 1000° C.) silicate minerals such as olivines, serpentines, vermiculites, anthophyllites, cummingtonites, enstatites, pyropes, spinels and similarly composed industrially derived compounds with Mg as a major component as defined below.

Preferably the magnesium silicates should contain more than 25% MgO, in particular more than 40% Mgo.

Preferably the content of CaO should be less than 1%, in particular less than 0.5%.

Preferably the content of alkali metals should be less than 1%, in particular less than 0.3% calculated as oxides.

If the content of $Al_2O_3$ is higher than 3%, reaction temperatures in the reaction zone should be lower than 1550° C. to avoid formation of aluminium carbide.

Preferably the sum of other volatile elements such as S and Cl and metals like Zn, Cd, Hg, etc. should be less than 1%, in particular less than 0.5%.

Magnesium silicates further include natural rocks composed of more than 50% Mg silicates as defined above, preferably more than 80%, in particular rocks composed of more than 90% silicates, and upgraded magnesium silicate rich industrial waste produces, such as used forsterite furnace linings.

In the present context the term "carbon" is intended comprise carbon rich materials, such as antracite, carbon black and coke.

These carbon rich materials should in general have the following analysis:

C content>90%
Ash content<2%
Volatiles<8%
Preferably C content>96%
Ash content<1%
Volatiles<3%
In particular C content>98.5%
Ash content<0.5%
Volatiles<1.0%

The starting material is preferentially ground to an average particle size less than about 45 μm. The carbon rich material has preferentially an average particle size about 100 nm. The reaction mixture is preferentially introduced into the reaction zone as briquettes having a porosity of about 57%.

According to a first preferred embodiment the starting material is mixed with carbon in an amount of 2.9–3.3 mole C/mole $SiO_2$ plus 1.0–1.3 mole C/mole FeO plus 3.0–3.4 mole C/mole $Fe_2O_3$ plus 0.0–0.25 mole C/mole MgO, preferably in an amount of 2.9–3.2 mole C/mole $SiO_2$ plus 1.0–1.2 mole C/mole FeO plus 3.0–3.2 mole C/mole $Fe_2O_3$ plus 0–0.2 mole C/mole MgO, in particular in an amount of 2.9–3.1 mole C/mole $SiO_2$ plus 1.0–1.05 mole C/mole FeO plus 3.0–3.1 mole C/mole $Fe_2O_3$ plus 0–0.15 mole C/mole MgO.

According to other preferred embodiments:

the reaction temperature $T_r$ is kept within the interval 1400°–1500° C. and MgO and $Mg_2SiO_4$ are precipitated in the condensation zone by injection of an oxygen-containing gas, such as molecular oxygen, air, $CO_2$, CO, $H_2O$ and mixtures thereof;

magnesium oxide containing minor amounts of oxides of Fe, Si, Ca and Al is used as starting material;

olivine is used as starting material;

$T_r$ is less than 1550° C., when the $Al_2O_3$ content of the reaction mixture is greater than 1 wt %;

the "$Si_xFe$" and the metallic iron are separated from the residue in the reduction zone by conventional methods, such as magnetic or electrostatic separation or flotation, whereafter Au and siderophilic elements, such as Mn, Cr, Ni and metals from the platinum group are recovered by conventional methods, such as leaching;

the SiC formed in the reduction zone and the first condensation zone is recovered as a by-product from the residue in the reduction zone and the first condensation zone, respectively; and the MgO formed in the reduction zone and the first condensation zone is recovered as a by-product from the residue in the reduction zone and the first condensation zone, respectively.

DETAILED DESCRIPTION

Figure 1:
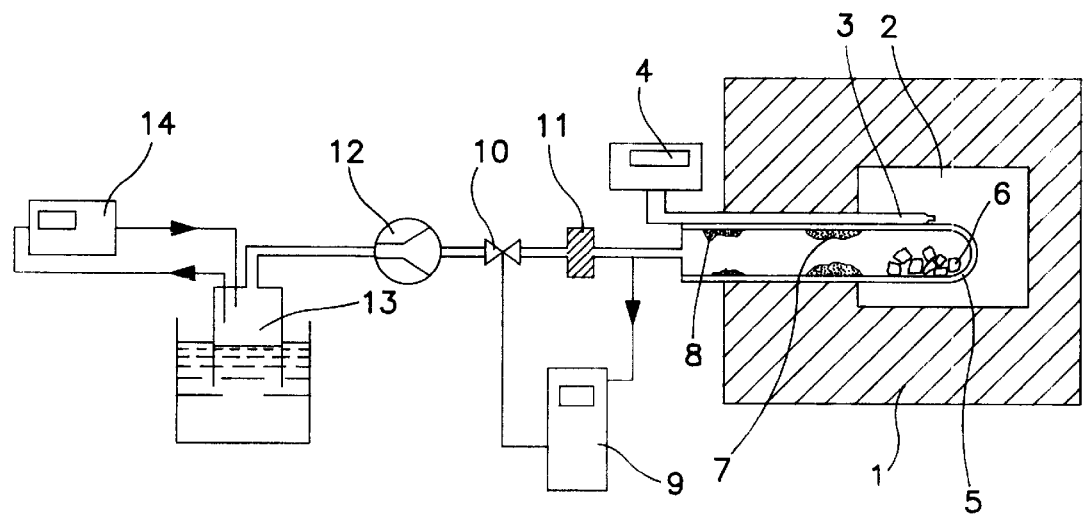
Figure 2:
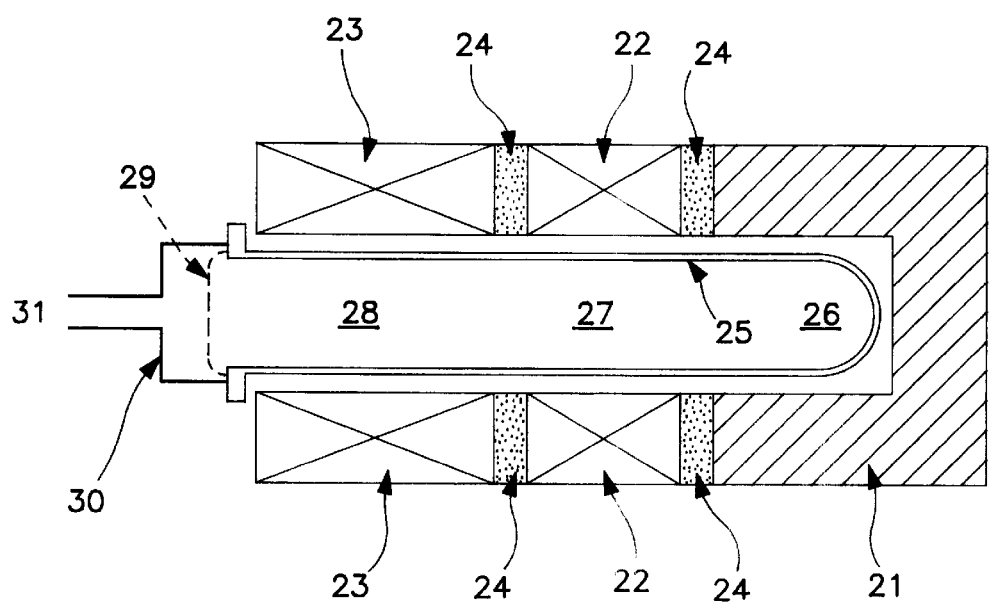
Figure 3:
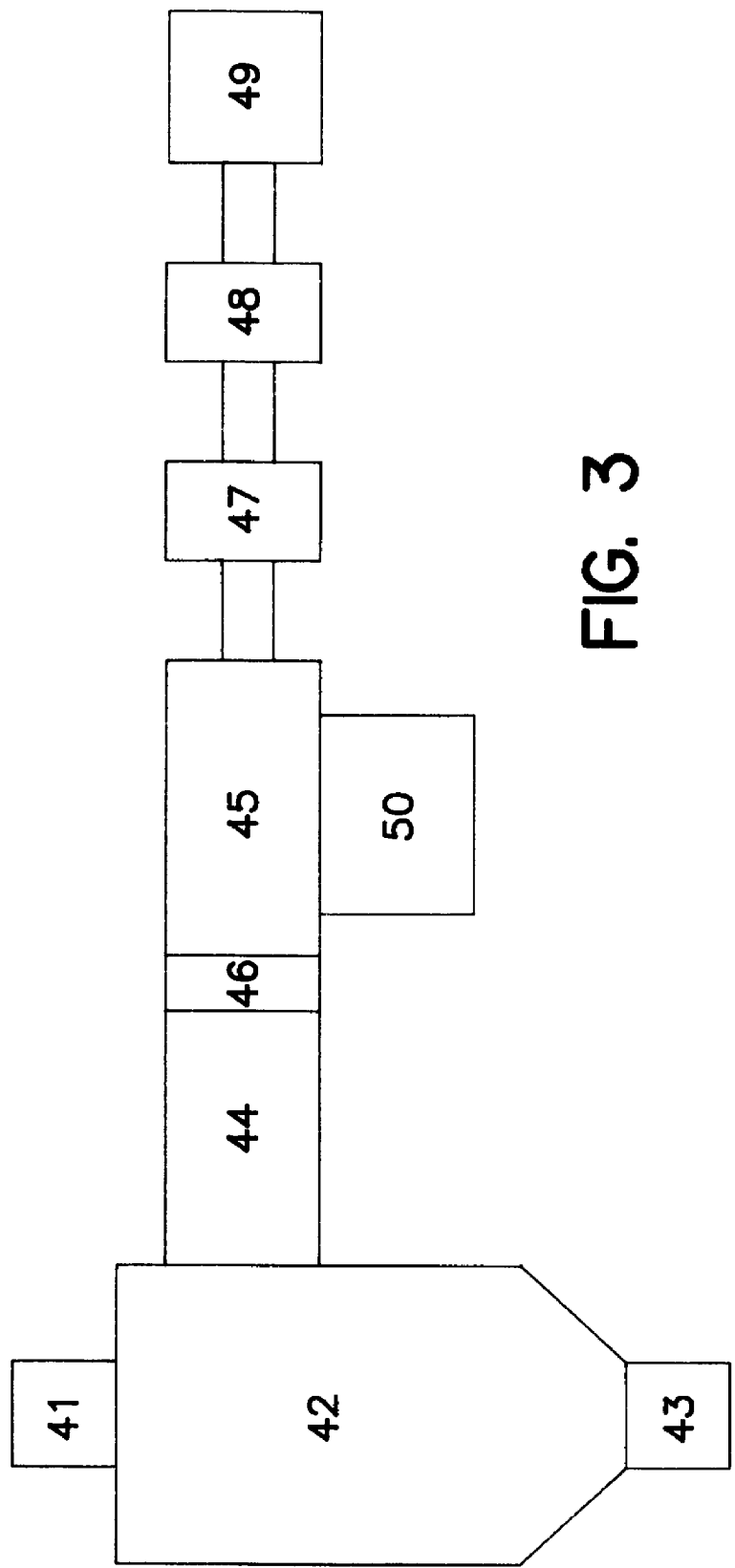
Figure 4A:
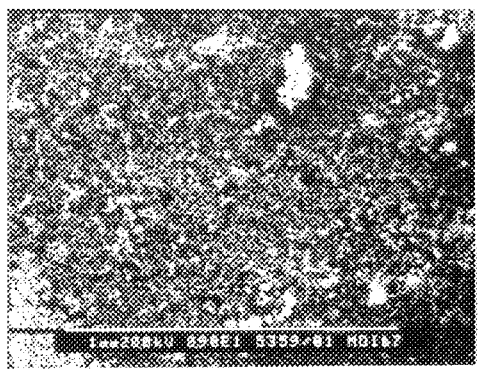
Figure 4B:
Figure 5A:
Figure 5B:
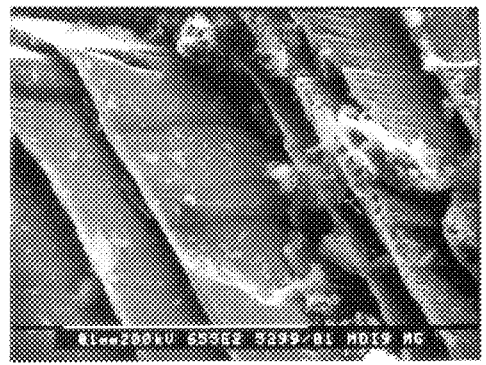
Figure 6A:
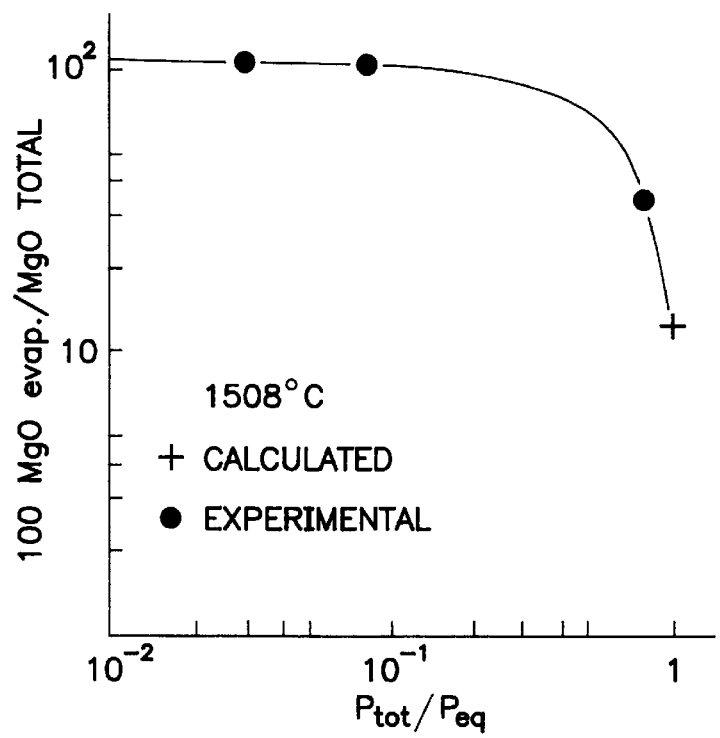
Figure 6B:
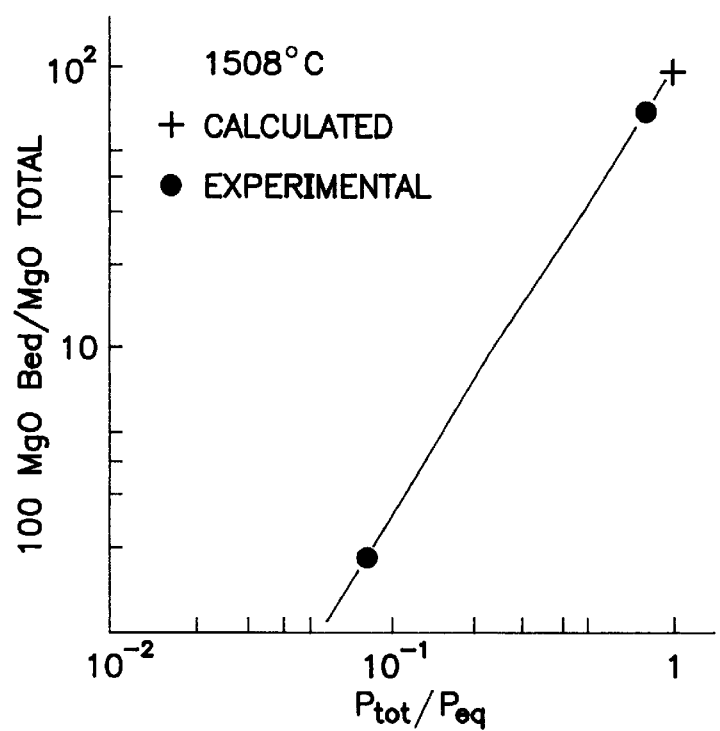

In the following the invention is further described by reference to the drawing in which FIG. 1 shows a laboratory scale experimental apparatus used for experiments reported in Examples 1–5, FIG. 2 shows a laboratory scale experimental apparatus used for experiments reported in Example 6, FIG. 3 shows an apparatus for carbothermal processing of magnesium silicate minerals and rocks, FIGS. 4A and 4B show SEM photoes of the reacted bed material from Example 1, FIGS. 5A and 5B show SEM photoes of columnar crystals of magnesium metal from Example 5, and FIG. 6 shows diagrams illustrating the yield of MgO(s) from the bed, and MgO transferred to the vapour phase as a function of the reduced pressure for the carbotermal conversion of olivine 613 at 1508±2° C. (Examples 1, 4 and 5).

FIG. 1. shows a laboratory scale experimental apparatus used for experiments reported in Examples 1–5 having an electrically heated chamber furnace 1 rated to 1600° C., only the heat insulation is shown, a furnace chamber 2, a thermocouple for measurement of furnace temperature 3, a millivoltmeter 4 connected to the thermocouple 3, a reactor and condenser tube 5 consisting of a close end graphite tube arranged inside a close end alumina tube, having a charge 6 in the reactor end of tube 5, a first condensate 7 in the hot end of the condenser part of tube 5, and a second condensate 8 in the cold end of the condenser part of tube 5, a pressostat 9 for control of gas pressure in the reactor and condenser tube 5, a pneumatic valve 10 controlled by the pressostat 9, a dust filter 11, a vacuum pump 12, a gas reservoir 13 for collection of the exhaust gas from the reactor/condenser tube 5, and a CO monitor 14.

FIG. 2. shows a laboratory scale experimental apparatus used for experiments reported in Example 6 having an electrically heated furnace 21 rated to 1600° C. to heat a reactor part of a reactor/condenser tube, an electrically heated furnace 22 rated to 1400° C. to heat a first condenser part of the reactor/condenser tube, an electrically heated furnace 23 rated to 1200° C. to heat a second condenser part of the reactor/condenser tube, a heat insulation 24 between the three furnace elements, a reactor and condenser tube 25 consisting of a close end graphite tube arranged inside a close end alumina tube, having a reaction chamber part 26 in the reactor end of the tube 25, and a first condenser part 27 of the tube 25, and a second condenser part 28 of the tube 25, a particle filter 29 for collection of MgO—C powder formed in the second condenser part 8 of the tube 5, a vacuum tight removable lid 30, and a vacuum line 31 leading to a pneumatic valve controlled by a pressostat between the condenser and a vacuum pump.

FIG. 3 shows an apparatus for carbothermal processing of magnesium silicate minerals and rocks having a vacuum lock system 41 for loading the granulated raw mix arranged at the top of an electrically heated furnace 42 rated to at least 1400° C. and preferably to 1800° C. with a graphite lining for carbothermal processing of the raw mix, a vacuum lock system 43 for unloading the residual bed material from the furnace 42, an electrically heated first condenser 44 with a temperature control system for maintaining a constant temperature in the range from 1000° C. to 1500° C. having a carbon lining and containing reactive carbon in a form suitable for the formation of SiC by reaction with the SiO component of the gas phase generated in the furnace 42, an electrically heated second condenser 45 for the production of fine MgO powder or metallic magnesium.

For the production of fine MgO powder the second condenser is equipped with a temperature control system for maintaining a constant temperature in the range from 600° C.–1500° C., and a filter system for the collection of fine particles, and optionally a system for controlled introduction of an oxygen containing gas.

For the production of metallic magnesium the second condenser is equipped with a temperature control system for maintaining a constant temperature in the range from 200° C. to 650° C., and a system for collection of the condensed metal.

The apparatus has also a steep temperature gradient zone 46 arranged between the first condenser 44 and the second condenser 45. This zone may be designed as a divergent nozzle for supersonic adiabatic cooling of the gas passing from the first condenser 44 to the second condenser 45.

Finally, the apparatus has a cyclone 47 for precipitating particles entrained with the exhaust gas from the second condenser 45, a fine particle filter 48, a vacuum pump 49 capable of maintaining a pressure in the range $10–10^5$ Pa in the furnace 42, in the first condenser 4 and in the second condenser 45, and a vacuum lock system 50 for unloading metallic magnesium formed in the second condenser.

FIGS. 4A and B show SEM photos of the reacted bed material from Example 1 (Procedure 1: 1506° C., $P_{tot}/P_{eq}$=0.79, 320 min.).

A) Overview (No. 5359/01).

B) Close up showing micron sized grains of MgO and SiC together with a ≈5 micron droplet of "$Si_xFe$" (No. 5357/01).

FIGS. 5A and B show SEM photos of columnar crystals of magnesium metal from Example 5 (Procedure 1: 1510° C., $P_{tot}/P_{eq}$=0.029, 115 min.).

The Mg-crystals were formed by vapour deposition in the coldest part of the condenser (<650° C.).

A) Overview (No. 5300/01).

B) Close up (No. 5299/01).

FIG. 6 shows diagrams illustrating the yield of MgO(s) from the bed, and MgO transferred to the vapour phase as a function of the reduced pressure for the carbotermal conversion of olivine 613 at 1508°±2° C. (Examples 1, 4 and 5).

In the following the basic philosophy behind the present invention is further explained with reference to FIG. 6:

The reaction products formed upon suitable heating of mixtures of e.g. olivine ($Mg_2SiO_4$) and carbon (C) depend on the molar ratio between the reactants and the gas pressure during processing. Thus, a mixture of 1 mole olivine ($Mg_2SiO_4$) and 3 mole carbon (C) may react according to reaction (1') or (1") depending on the total gas pressure.

$Mg_2SiO_4(s)+3C(s) \rightarrow 2MgO(s)+SiC(s)+2CO(g)$     (1')

$Mg_2SiO_4(s)+3C(s) \rightarrow 2Mg(g)+SiO(g)+3CO(g)$     (1")

TABLE A

Equations for calculation of the equilibrium partial pressure of all major gas species involved in the reaction between 1 mole $Mg_2SiO_4$ and 3 mole C at 1400° C.–1750° C.

| | | | | |
|---|---|---|---|---|
| (a) | $logP_{CO}$ | = | $-17196T^{-1}$ | + 10.746 |
| (b) | $logP_{Mg}$ | = | $-15021T^{-1}$ | + 8.526 |
| (c) | $logP_{SiO}$ | = | $-21473T^{-1}$ | + 10.886 |
| (d) | $logPO_2$ | = | $-46405T^{-1}$ | + 10.536 |

Thermodynamic calculations show that reaction (1') will proceed from left to right in the temperature range 1400° C. to 1750° C. if the partial pressure of CO (PCO) is less or equal to the pressure (kPa) defined by equation (a) in Table A. At thermodynamic equilibrium the simultaneous partial pressures of all the other important gas species (Mg(g), SiO(g), $0_2$(g)) involved in the reaction are defined by equation (b), (c) and (d) in Table A. From the thus defined partial pressure of the major gas species and mass balance on the involved reactions, the total gas pressure ($P_{eq}$), the composition and amount of volatilized material, and the residual composition of the bed can be calculated for equilibrium conversion of $Mg_2SiO_4$(s) into MgO(s) and SiC(s) according to equation (1') with the minimum excess carbon necessary for the formation of equilibrium amount of Mg(g) and SiO(g) added. The total equilibrium gas pressure $P_{eq}$, thus calculated is given by:

$log(P_{eq})=-17043*T^{-1}+10.705$

No reaction will occur, if the total vapour pressure ($P_{tot}$) of the actual gas phase over the reaction mixture is higher than $P_{eq}$. At equilibrium conditions (($P_{tot}/P_{eq}$)=1) the calculated yield of MgO(s) from the bed varies from 86.4% at 1400° C. to 91.8% at 1700° C.

As $P_{tot}$ is reduced below $P_{eq}$ further evaporation of the charge will occur according to reaction (1") and the yield of MgO(s) and SiC(s) in the bed is reduced. Thus, as the pressure is reduced progressively below $P_{eq}$, reaction (1") becomes more and more important relative to reaction (1'). The experimental work shows that reaction (1") is dominating, when ($P_{tot}/P_{eq}$)≦≈0.7, and that the yield of MgO(s) from the bed (reaction 1') is <5%, when ($P_{tot}/P_{eq}$) <≈0.2 (FIG. 6), i.e. more than 95% of the MgO from the olivine evaporates during processing.

Here it should be realized that although the nominal furnace temperature, which is used to calculate $P_{eq}$ (1508°∓2° C. in FIG. 6) is equal to the actual bed temperature, when ($P_{tot}/P_{eq}$)≧1, this is not the case when the total pressure is reduced and volatilization becomes dominating. Under these conditions evaporation will tend to cool the bed to the temperature, where $P_{tot}$ is equal to the steady state evaporation gas pressure, or to a temperature, where volatilization decreases for kinetic reasons (≈1400° C.; Example 3). For nominal furnace temperatures above ≈1500° C. and ($P_{tot}/P_{eq}$)<≈0.1, the rate of evaporation will largely be controlled by the rate at which heat is supplied. This is similar to what occurs during sublimation processes in general. Under these conditions the nominal furnace temperature reflects the rate of heat supply, and not the bed temperature. Thus, the 1508° C. results for $P_{tot}$≦1.1 kPa (($P_{tot}/P_{eq}$)<≈0.1; Examples 4, 5 and 6) are representative for what occurs at the same $P_{tot}$ and nominal furnace temperatures in the range from 1400° to 1750° C.

The following examples describe in greater detail preferred embodiments of the process invented for the transformation of magnesium silicates (e.g. olivine) into:

A) Refractory masses consisting of periclase, silicon carbide and optionally magnesium oxide enriched forsterite.

B) Well-separated metallic magnesium and silicon carbide.

C) Well-separated magnesium oxide and silicon carbide.

The chemical composition of and physical data for the raw materials used in Example 1 to 6 are given in Table 1. The composition of and physical data for the granulated carbon-fosterite mixtures prepared from these raw materials and used in the experimental work are given in Table 2.

The experiments were carried out according to the following procedures.

Procedure 1

The laboratory scale experimental apparatus used in this part of the work for the carbothermal conversion at temperatures between 1200° C. and 1500° C. and pressures between 0.4–10.4 kPa of the briquetted raw mix are shown in FIG. 1.

Charges of known weight were placed in the reactor/condenser, a close end graphite tube inside a close end alumina tube. Thereafter the reactor/condenser was evacuated, filled with Ar to the desired pressure, and moved into the preheated furnace, at a speed corresponding to a heating rate of about 50° C./min. The pressure controlled pneumatic valve in front of the vacuum pump was used to maintain a constant pressure in the reactor/condenser during the carbothermal reaction. The gas evolved in the process was collected after the pump, and the CO concentration was monitored.

After carbothermal treatment, the reaction products in the bed and the different fractions condensed from the vapour phase were collected separately, weighed and examined by XRD, TG and SEM/EDS.

Procedure 2

The laboratory scale experimental apparatus used in this part of the work for the carbothermal conversion at 1510° C. and a pressure of 1.1 kPa of the briquetted raw mix are shown in FIG. 2.

Charges of known weight were placed in the reactor/condenser, a close end graphite tube inside a close end alumina tube. Thereafter the reactor/condenser was evacuated, filled with Ar to the desired pressure, and moved into the preheated furnace unit, at a speed corresponding to a heating rate of about 50° C./min. A pressure controlled pneumatic valve between the condenser and the vacuum pump was used to maintain a constant pressure in the reactor/condenser during the carbothermal reaction. The gas evolved in the process was collected after the pump, and the CO concentration was monitored.

After carbothermal treatment, the reaction products in the bed and the different fractions condensed from the vapour phase were collected separately, weighed and examined by XRD, TG and SEM/EDS.

TABLE 1

Chemical composition of and physical data for the raw materials used in the experimental work

|  | Olivine 613 wt % | Carbon Black Degussa Flamruss 101 wt % |
|---|---|---|
| $SiO_2$ | 40.84 | — |
| $TiO_2$ | 0.01 | — |
| $Al_2O_3$ | 0.31 | — |
| $Fe_2O_3$ | 0.50 | — |

TABLE 1-continued

| FeO | 8.12 | — |
|---|---|---|
| MnO | 0.13 | — |
| MgO | 49.41 | — |
| CaO | 0.33 | — |
| $Na_2O$ | 0.07 | — |
| $K_2O$ | 0.00 | — |
| $P_2O_5$ | 0.01 | — |
| Trace elements*) | 0.54 | — |
| LOI | 0.59 | — |
| C | — | 98.95 |
| Ash Content | — | 0.05 |
| Volatiles | — | 1.00 |
|  | 100.86 | 100.00 |
| Particle Size | <45 μm | 95 nm |
| Spec. Surface Area | — | 20 m²/g |

*)Trace Elements (ppm)

| V | 10 |
|---|---|
| Cr | 1770 |
| Ni | 3480 |
| Cu | 10 |
| Zn | 30 |
| Rb | 0 |
| Sr | 0 |
| Y | 0 |
| Zr | 0 |
| Nb | 0 |
| Mo | 0 |
| Sn | 0 |
| Ba | 80 |
| La | 0 |
| Ce | 0 |
| Pt | <0.01 |
| Sum | 5380 |

TABLE 2

Composition of and physical data for the carbon-fosterite mixtures used in the experimental work

|  | Olivine 613 wt % | Carbon Black Degussa Flamruss 101 wt % |
|---|---|---|
| MIX A | 77.82 | 22.18 |
| MIX B | 70.00 | 30.00 |
| Briquette Size | 0.5*1*1 cm³ |  |
| Porosity | 57 vol % |  |

A) Production of Refractory Masses Consisting of Periclase (MgO), Silicon Carbide (SiC) and Traces of Magnesium Oxide Enriched Forsterite ($Mg_2SiO_4$)

EXAMPLE 1

In this experiment 11.2 g of carbon-olivine briquettes of mix A (Table 2) were treated according to procedure 1 at 1506° C. and a gas pressure ($P_{tot}$) of 10.4 kPa for 320 min.

The pressure ($P_{tot}$) was chosen to be 0.84 of the equilibrium gas pressure ($P_{eq}$) as calculated from thermodynamic data. The end of the reaction after 320 min. was defined by a gradual drop in the CO evolution as determined in the pumped out exhaust gas.

The analytical data on the phase composition of the reacted bed and the deposited products in the condenser are summarized in Table 3. The reacted bed consists of highly porous briquettes greenish in colour. The phases present were micron sized MgO and SiC, droplets of "$Si_xFe$" and a little residual $Mg_2SiO_4$ (vide FIG. 4). The yield of MgO(s) from the bed was 67%.

Part of the converted bed material was milled, and the "Si$_z$Fe" droplets were removed magnetically. Based on the spatial distribution of the phases and the total sample weight it was estimated that more than 95 wt % of the original 8.62 wt % iron oxides was removed in this way.

SEM/EDS analysis shows that a number of transition elements (Cr, Mn, Ni and Pt) which occur in trace amounts in olivine 613 have been concentrated in the "Si$_z$Fe" droplets. The semi-quantitative EDS analysis indicates average concentrations of 2 wt % Cr, 0.3 wt % Mn, 3 wt % Ni and 0.1 wt % Pt in the "Si$_z$Fe" droplets.

TABLE 3

Experiment No. 1, summary of results on the carbothermal reduction of olivine 613 mixed with carbon black:

| Bed Temperature | 1506°C. | |
|---|---|---|
| Gas Pressure | 10.4 kpa | |
| Reation Time | 320 min. | |
| Charge | 11.2 g | 77.82 wt % olivine 613 |
| | | 22.18 wt % carbon black | wt % of charge

| | SUM | "Si$_z$Fe" | Si | SiC | Mg$_2$SiO$_4$ | MgO | Mg | C |
|---|---|---|---|---|---|---|---|---|
| BED | | | | | | | | |
| 1506° C. | 52.0 | 6.3 | — | 18.7 | 1.2 | 25.8 | — | — |
| VAPOUR DEPOSIT | | | | | | | | |
| 1450° C. | 3.1 | — | — | 0.6 | 0.8 | 1.7 | — | — |
| 1300° C. | 2.1 | — | — | — | — | 1.5 | — | 0.6 |
| | 57.2 | 6.3 | — | 19.3 | 2.0 | 29.0 | — | 0.6 |
| CO GAS PHASE | | | | | | | | |
| 20° C. | 37.4 | | | | | | | |

| | | | % YIELD |
|---|---|---|---|
| RECOVERED | 94.6 | MgO$_{bed}$ | 67.1 |
| | | MgO$_{condensed}$ | 8.3 |
| | | MgO$_{olivine}$ | 3.0 |
| Mg$_{lost}$ | 5.0 | MgO$_{lost}$ | 21.6 |
| | 99.6 | MgO$_{charge}$ | 100.0 |

EXAMPLE 2

In this experiment 12.5 g of carbon-olivine briquettes of mix A (Table 2) were treated according to procedure 1 at 1580° C. and a gas pressure (P$_{tot}$) of 31.3 kPa for 260 min.

The pressure (P$_{tot}$) was chosen to be 0.97 of the equilibrium gas pressure (P$_{eq}$) as calculated from thermodynamic data. The end of the reaction after 260 min. was defined by a gradual drop in the CO evolution as determined in the pumped out exhaust gas.

The reacted bed consisted of highly porous briquettes greenish in colour. The phases present were micron sized MgO and SiC, droplets of "Si$_z$Fe" and a little residual Mg$_2$SiO$_4$. The vapour deposited material was not analysed in detail.

The bed-yield of MgO(s) was 82%.

EXAMPLE 3

In this experiment 13.5 g of carbon-olivine briquettes of mix A (Table 2) was treated according to procedure 1 at 1405° C. and a gas pressure (P$_{tot}$) of 3.4 kPa for 180 min.

The pressure (P$_{tot}$) was chosen to be 0.97 of the equilibrium gas pressure (P$_{eq}$) as calculated from thermodynamic data. The experiment was stopped after 180 min., while CO evolution was still observed as determined in the pumped out exhaust gas.

The weight loss observed was 18.7 wt % including some MgO which was not recovered.

The reacted bed consisted of highly porous briquettes black-green in colour. The phases present were olivine (39 wt %), periclase (17 wt %), SiC (11 wt %), "Si$_z$Fe" (3 wt %) and carbon (11 wt %).

The bed-yield of MgO(s) was 44%, while the unreacted olivine contained about 50% of the initial MgO content.

Further, exploratory work on briquettes of mix A (Table 2) using a Mettler DTA/TG showed that very little reaction occurred at 1200° C. when a flow of pure argon was used to remove the gaseous reaction products (estimated: (P$_{tot}$-P$_{Ar}$)/P$_{eq}$≈0.97). After 120 min. the total weight loss was only 4 wt %, and no formation of periclase (MgO) was observed.
B) Production of Well-Separated Metallic Magnesium (Mg) and Silicon Carbide (SiC).

EXAMPLE 4

In this experiment 15 g of carbon-olivine briquettes of mix A (Table 2) were treated according to procedure 1 at 1510° C. and a gas pressure (P$_{tot}$) of 1.1 kPa for 103 min.

The pressure (P$_{tot}$) was chosen to be 0.079 of the equilibrium gas pressure (P$_{eq}$) as calculated from thermodynamic data. The end of the reaction after 103 min. was defined by a gradual drop in the CO evolution as determined in the pumped out exhaust gas.

The analytical data on the phase composition of the reacted bed and the deposited products in the condenser are summarized in Table 4. The residual bed material consists mainly of droplets of "Si$_z$Fe" with a little periclase (MgO), traces of SiC and no forsterite. Due to the low pressure and the ≈1:3 molar ratio between the Mg$_2$SiO$_4$ part of olivine and the carbon most of the silicon and magnesium from the olivine 613 in the raw mix was volatilized according to the reaction:

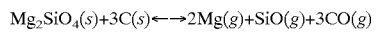

$$Mg_2SiO_4(s)+3C(s) \leftrightarrow 2Mg(g)+SiO(g)+3CO(g)$$

The silicon was redeposited as SiC in the hottest part of the condenser (1480° C.∓20° C.) together with periclase (MgO) and some forsterite formed by back-reaction.

The yield of metallic magnesium was 28 wt % formed in the coldest part of the condenser (<650° C.). The metallic magnesium contained about 4.4 wt % periclase (MgO) as the main impurity.

EXAMPLE 5

In this experiment 9.4 g of carbon-olivine briquettes of mix A (Table 2) were treated according to Procedure 1 at 1510° C. and a gas pressure (P$_{tot}$) of 0.4 kPa for 115 min.

The pressure (P$_{tot}$) was chosen to be 0.029 of the equilibrium gas pressure (P$_{eq}$) as calculated from thermodynamic data. The end of the reaction after 115 min. was defined by a gradual drop in the CO evolution as determined in the pumped out exhaust gas.

The analytical data on the phase composition of the reacted bed and the deposited products in the condenser is summarized in Table 5. The residual bed material consists mainly of droplets of "Si$_z$Fe" and a little SiC. Due to the low pressure and the ≈1:3 molar ratio between the Mg$_2$SiO$_4$ part of olivine and the carbon, most of the silicon and magnesium from the olivine 613 in the raw mix was volatilized according to the reaction:

$Mg_2SiO_4(s)+3C(s) \leftarrow \rightarrow 2Mg(g)+SiO(g)+3CO(g)$

The silicon was mainly redeposited as Si in the hottest part of the condenser (1300° C.) together with some forsterite formed by back-reaction, a little periclase (MgO) and traces of SiC.

The yield of metallic magnesium was 74.6 wt % from the coldest part of the condenser (<650° C.). The magnesium was deposited as columnar crystals (vide FIG. 5). The metallic magnesium contained about 4.9 wt % periclase (MgO) as the main impurity.

TABLE 4

Experiment No. 4, summary of results from carbothermal reduction of olivine mixed with carbon black:

| Bed Temperature | 1510° C. | |
|---|---|---|
| Gas Pressure | 1.1 kPa | |
| Reation Time | 103 min. | |
| Charge | 15.0 g | 77.82 wt % Olivine 613 |
| | | 22.18 wt % Carbon Black |
| | | wt % of charge |

| | SUM | "Si$_z$Fe" | Si | SiC | Mg$_2$SiO$_4$ | MgO | Mg | C |
|---|---|---|---|---|---|---|---|---|
| BED | | | | | | | | |
| 1510° C. | 13.7 | 13.0 | — | tr | — | 0.7 | — | — |
| VAPOUR DEPOSIT | | | | | | | | |
| 1480 ∓ 20° C. | 26.5 | — | — | 8.5 | 6.2 | 11.8 | — | — |
| 1300 ∓ 100° C. | 5.8 | — | — | — | — | 4.5 | — | 1.3 |
| 925 ∓ 275° C. | 9.2 | — | — | — | — | 6.8 | — | 2.1 |
| <650° C. | 6.5 | — | — | — | — | 0.3 | 6.5 | — |
| | 61.7 | 13.0 | — | 8.5 | 6.2 | 24.1 | 6.5 | 3.4 |
| CO GAS PHASE | | | | | | | | |
| 20° C. | 41.1 | | | | | | | |

| | | % YIELD |
|---|---|---|
| RECOVERED | 102.8 | MgO$_{bed}$ | 1.8 |
| | | MgO$_{condensed}$ | 60.9 |
| | | MgO$_{olivine}$ | 9.2 |
| | | Mg as MgO | 28.1 |
| | | MgO$_{charge}$ | 100.0 |

TABLE 5

Experiment No. 5, summary of results from carbothermal reduction of olivine mixed with carbon black:

| Bed Temperature | 1510° C. | |
|---|---|---|
| Gas Pressure | 0.4 kPa | |
| Reation Time | 115 min. | |
| Charge | 9.4 g | 77.82 wt % Olivine 613 |
| | | 22.18 wt % Carbon Black |
| | | wt % of charge |

| | SUM | "Si$_z$Fe" | Si | SiC | Mg$_2$SiO$_4$ | MgO | Mg | C |
|---|---|---|---|---|---|---|---|---|
| BED | | | | | | | | |
| 1510° C. | 11.0 | 7.1 | — | 3.9 | — | — | — | — |
| VAPOUR DEPOSIT | | | | | | | | |
| 1300° C. | 15.6 | — | 9.4 | tr | 5.1 | 1.1 | — | — |
| 925 ∓ 275° C. | 6.3 | — | — | — | — | 4.8 | — | 1.5 |
| <650° C. | 18.5 | — | — | — | — | 0.9 | 17.3 | 0.3 |
| | 51.4 | 7.1 | 9.4 | 3.9 | 5.1 | 6.8 | 17.3 | 1.8 |
| CO GAS PHASE | | | | | | | | |
| 20° C. | 58.2 | | | | | | | |

| | | % YIELD |
|---|---|---|
| RECOVERED | 109.6 | MgO$_{bed}$ | 0.0 |
| | | MgO$_{condensed}$ | 17.7 |
| | | MgO$_{olivine}$ | 7.6 |
| | | Mg as Mgo | 74.6 |
| | | MgO$_{charge}$ | 99.9 |

C) Production of Well-Separated Magnesium Oxide and Silicon Carbide

EXAMPLE 6

In this experiment 14.2 g of carbon-olivine briquettes of mix B (Table 2) were treated according to procedure 2 at 1510° C. and a gas pressure ($P_{tot}$) of 1.1 kPa for 120 min.

The pressure ($P_{tot}$) was chosen to be 0.079 of the equiblibrium gas pressure ($P_{eq}$) as calculated from thermodynamic data. The end of the reaction after 120 min. was defined by a gradual drop in the CO evolution as determined in the pumped out exhaust gas.

The analytical data on the phase composition of the reacted bed and the deposited products in the condenser are summarized in Table 6. The residual bed material consisted of SiC, droplets of "Si$_z$Fe" and a little residual carbon.

The only phase detected in condenser I held at 1360° C. was SiC.

The material collected from condenser II held at 800° C. was a fine black powder composed of periclase (MgO) and carbon (C). The carbon was removed by heating the powder to 800° C. in air for 5 hours. The resulting powder was white, and the only phase detected by XRD was periclase (MgO). The yield of periclase was 95 wt %.

In the above-mentioned experiments olivine was used as starting material. Similar results can be obtained with other magnesium silicate minerals and crude magnesia.

TABLE 6

Experiment No. 6, summary of results from carbothermal reduction of olivine mixed with carbon black:

| Bed Temperature | 1510° C. | |
|---|---|---|
| Gas Pressure | 1.1 kPa | |
| Reation Time | 120 min. | |
| Charge | 14.2 g | 70.00 wt % Olivine 613 |
| | | 30.00 wt % Carbon Black |
| | | wt % of charge |

| | SUM | "Si$_z$Fe" | Si | SiC | Mg$_2$SiO$_4$ | MgO | Mg | C |
|---|---|---|---|---|---|---|---|---|
| BED | | | | | | | | |
| 1510° C. VAPOUR DEPOSIT | 24.5 | 5 | — | 18.5 | — | — | — | 1 |
| Condenser I 1360° C. | 0.2 | — | — | 0.2 | — | — | — | — |
| Condenser II | 43.0 | — | — | — | — | 33 | — | 10 |

TABLE 6-continued

| 800° C. | | | | | | | | |
|---|---|---|---|---|---|---|---|---|
| | 67.7 | 5 | — | 18.7 | — | 33 | — | 11 |
| CO | | | | | | | | |
| GAS PHASE | | | | | | | | |
| 20° C. | 33.0 | | | | | | | |

| | | | % YIELD |
|---|---|---|---|
| RECOVERED | 100.7 | MgO$_{bed}$ | 0.0 |
| | | MgO$_{condensed}$ | 95.0 |
| | | MgO$_{lost}$ | 5.0 |
| | | MgO$_{charge}$ | 100.0 |

What is claimed is:

1. A method of producing metallic magnesium by carbothermal reduction of a starting material selected from the group consisting of magnesium oxide containing minor amounts of oxides of Fe, Si, Ca and Al; natural and industrially produced magnesium silicate minerals; and mixtures thereof which comprises:
mixing the starting material with carbon to form a reaction mixture, the carbon being present in an amount of at least 1 mole C/mole SiO$_2$ plus at least 1 mole C/mole FeO plus at least 3 mole C/mole Fe$_2$O$_3$ plus at least 1 mole C/mole MgO;
heating the reaction mixture in a reduction zone to a temperature $T_r$ of from 1400° to 1700° C. and at a pressure $p_r$ of from 0.01–1.75 kPa;
reducing iron oxide components of the starting material to iron in the reduction zone;
reducing a silica component of the starting material to SiO, which is partly converted to SiC and an alloy of Si and Fe, "Si$_z$Fe", in the reduction zone, partly evaporated from the reduction zone and converted to SiC, Si, and/or Mg$_2$SiO$_4$ by reaction with carbon in a separate first condensation zone at a pressure $p_1$ of from 0.01–1.1 kPa and at a temperature $T_1$ higher than:

$$T_{min} \text{°C.} = \frac{-32217}{2\log p_1 - 19.92} - 273.15$$

and lower than $T_{min}$+100° C. and in any case lower than $T_r$;
reducing a magnesium oxide component of the starting material to gaseous metallic magnesium in the reduction zone;
evaporating said gaseous metallic magnesium from the reduction zone and condensating said gaseous metallic magnesium in a separate second condensation zone arranged downstream from the first condensation zone at a pressure $p_2$ of from 0.01–1.1 kPa and at a temperature $T_2$ less than 638° C.; and
withdrawing CO formed by the reduction processes from the second condensation zone and maintaining the pressure $p_2$ at a preselected value with a pump;
whereby the temperature gradient between the first condensation zone and the second condensation zone is kept as steep as possible; and
whereby $p_2 \leq p_1 \leq p_r$.

2. The method of claim 1, wherein the steep temperature gradient between the first and second condensation zone is provided by rapid cooling by introducing gas from the first condensation zone into a divergent nozzle operated under the condition of underexpansion, ejecting mixed gas through said divergent nozzle, and enabling said mixed gas to adiabatically expand at a supersonic velocity, whereby the expansion ratio in the nozzle is from 12.5–2.

3. The method of claim 1, wherein the silica component of the starting material is essentially converted to SiC in the reaction mixture by operating with an amount of carbon of from 3 to 4 moles C/mole SiO$_2$ plus 1 to 2 moles C/mole FeO plus 3 to 4 moles C/mole Fe$_2$O$_3$ plus 1 to 2 moles C/mole MgO.

4. The method of claim 1, wherein the temperature gradient between the reduction zone and the first condensation zone is kept as steep as possible.

5. The method of claim 1, wherein magnesium oxide containing minor amounts of oxides of Fe, Si, Ca and Al is used as the starting material.

6. The method of claim 1, wherein olivine is used as the starting material.

7. The method of claim 1, wherein $T_r$ is less than 1550° C., when the content of Al$_2$O$_3$ in the reaction mixture is greater than 1 wt %.

8. The method of claim 1, wherein the "Si$_z$Fe" and metallic iron are separated from a residue in the reduction zone by a method selected from magnetic separation, electrostatic separation or flotation, whereafter Au and a siderophilic element selected from Mn, Cr, Ni or metals from the platinum group are recovered by leaching.

9. The method of claim 1, wherein the SiC formed in the reduction zone and the first condensation zone is recovered as a by-product from a residue in the reduction zone and the first condensation zone, respectively.

10. A method of producing pure magnesium oxide by carbothermal reduction of a starting material selected from the group consisting of magnesium oxide containing minor amounts of oxides of Fe, Si, Ca and Al; natural and industrially produced magnesium silicate minerals; and mixtures thereof, which comprises:
mixing the starting material with carbon to form a reaction mixture, the carbon being present in an amount of at least 1 mole C/mole SiO$_2$ plus at least 1 mole C/mole FeO plus at least 3 mole C/mole Fe$_2$O$_3$ plus at least 1 mole C/mole MgO;
heating the reaction mixture in a reduction zone to a temperature $T_r$ of from 1400° to 1700° C. and at a pressure $p_r$ of from $$0.01 \text{ to } 10^{(-16381 \cdot (T_r+273)^{-1}+10.03)} \text{kpa};$$

reducing iron oxide components of the starting material to iron in the reduction mixture;
reducing a silica component of the starting material to SiO, which is partly converted to SiC and an alloy of Si and Fe, "Si$_z$Fe", in the reduction zone, partly evaporated from the reduction zone and converted to SiC, Si, and/or Mg$_2$SiO$_4$ by reaction with carbon in a separate first condensation zone at a pressure $p_1$, where $p_1 \leq p_r$, and at a temperature $T_1$ higher than:

$$T_{min} \text{°C.} = \frac{-32217}{2\log p_1 - 19.92} - 273.15$$

and lower than $T_{min}$+100° C. and in any case lower than $T_r$;
reducing a magnesium oxide component of the starting material at least partially to gaseous metallic magnesium in the reduction zone; and
evaporating said gaseous metallic magnesium from the reduction zone and reacting said gaseous metallic magnesium with CO formed in the reduction zone with a separately added oxygen containing gas selected from molecular oxygen, air, $CO_2$, CO, $H_2O$ or mixtures thereof, to magnesium oxide and precipitating said magnesium oxide in a separate oxidation and condensation zone located downstream of the first condensation zone at a pressure $p_2$, where $p_2 \leq p_1$, and at a temperature $T_2$ of from 638° C. to $T_1$;

withdrawing the magnesium oxide from the oxidation and condensation zone and, if necessary, removing carbon from the withdrawn product by oxidation; and withdrawing gases formed by the reduction and oxidation processes from the oxidation and condensation zone and maintaining the pressure $p_2$ at a preselected value with a pump;

whereby $p_2 \leq p_1 \leq p_r$.

11. The method of claim 10, wherein the silica component of the starting material is essentially converted to SiC in the reaction mixture by operating with an amount of carbon of from 3 to 4 moles C/mole $SiO_2$ plus 1 to 2 moles C/mole FeO plus 3 to 4 moles C/mole $Fe_2O_3$ plus 1 to 2 moles C/mole MgO.

12. The method of claim 10, wherein the temperature gradient between the reduction zone and the first condensation zone is kept as steep as possible.

13. The method of claim 10, wherein the temperature gradient between the first condensation zone and the oxidation and condensation zone is kept as steep as possible.

14. The method of claim 10, wherein magnesium oxide containing minor amounts of oxides of Fe, Si, Ca and Al is used as the starting material.

15. The method of claim 10, wherein olivine is used as the starting material.

16. The method of claim 10, wherein $T_r$ is less than 1550° C., when the content of $Al_2O_3$ by the reaction mixture is greater than 1 wt %.

17. The method of claim 10, wherein the "$Si_zFe$" and metallic iron are separated from a residue in the reduction zone by a method selected from magnetic separation, electrostatic separation or flotation, whereafter Au and a siderophilic element selected from Mn, Cr, Ni or metals from the platinum group are recovered by leaching.

18. The method of claim 10, wherein the SiC formed in the reduction zone and the first condensation zone is recovered as a by-product from a residue in the reduction zone and the first condensation zone, respectively.

19. A method of processing a starting material selected from the group consisting of magnesium oxide containing minor amounts of oxides of Fe, Si, Ca and Al; natural and industrially produced magnesium silicate minerals; and mixtures thereof, which comprises:

mixing the starting material with carbon to form a reaction mixture, the carbon being present in an amount of at least 1 mole C/mole $SiO_2$ plus at least 1 mole C/mole FeO plus at least 3 mole C/mole $Fe_2O_3$ plus at least 1 mole C/mole MgO;

heating the reaction mixture in a reaction zone to a temperature $T_r$ of from 1400° to 1800° C. and at a pressure $p_r$ of from $10^{(-16381 \cdot (T_r+273)^{-1}+10.03)}$ to
$10^{(-17043 \cdot (T_r+273)^{-1}+10.75)}$ kPa, whereby iron oxide components of the starting material are reduced to iron in the reaction zone, a silica component of the starting material is at least partially converted to SiC and an alloy of Si and Fe, "$Si_zFe$", in the reaction zone, and a magnesium oxide component of the starting material is at least partially converted to magnesium oxide;

withdrawing an essentially fully converted mixture as end product from the reaction zone;

withdrawing CO formed by the reduction processes from the reaction zone and maintaining the pressure $p_r$ in the reaction zone at a preselected value with a pump.

20. The method of claim 19, including precipitating a mixture of MgO, $Mg_2SiO_4$, Si and SiC from the gas withdrawn from the reaction zone in a separate condensation zone located upstream of the pump at a pressure $p_1 \leq p_r$ and at a temperature of from 800° to 1500° C. and recovering said precipitated mixture.

21. The method of claim 19, which comprises mixing said starting material with 2.9 to 3.3 mole C/mole $SiO_2$ plus 1.0 to 1.3 mole C/mole FeO plus 3.0 to 3.4 mole C/mole $Fe_2O_3$ plus 0.0 to 0.25 mole C/mole MgO.

22. The method of claim 20, where the reaction temperature $T_r$ is from 1400° to 1500° C. and MgO and $Mg_2SiO_4$ are precipitated in the condensation zone by injection of an oxygen-containing gas, selected from oxygen, air, $CO_2$, CO, $H_2O$ or mixtures thereof.

23. The method of claim 19, wherein magnesium oxide containing minor amounts of oxides of Fe, Si, Ca and Al is used as the starting material.

24. The method of claim 19, wherein olivine is used as the starting material.

25. The method of claim 19, wherein $T_r$ is less than 1550° C., when the content of $Al_2O_3$ in the reaction mixture is greater than 1 wt %.

26. The method of claim 19, wherein the "$Si_zFe$" and metallic iron are separated from a residue in the reaction zone by a method selected from magnetic separation, electrostatic separation or flotation, whereafter Au and a siderophilic element selected from Mn, Cr, Ni or metals from the platinum group are recovered by leaching.

27. The method of claim 20, wherein the SiC formed in the reaction zone and the separate condensation zone is recovered as a by-product from a residue in the reaction zone and the separate condensation zone, respectively.

28. The method of claim 20, wherein the magnesium oxide formed in the reaction zone and the separate condensation zone is recovered as a by-product from a residue in the reaction zone and the separate condensation zone, respectively.

* * * * *